Patented Mar. 19, 1929.

1,706,333

UNITED STATES PATENT OFFICE.

MAXIMILIAN TOCH, OF NEW YORK, N. Y., ASSIGNOR TO STANDARD VARNISH WORKS, OF NEW YORK, N. Y., A CORPORATION OF NEW YORK.

ANTICORROSIVE MATERIAL.

No Drawing.    Application filed May 8, 1925. Serial No. 28,950.

My invention relates to an anti-rust or anticorrosive material, and consists of petrolatum with which has been incorporated basic or neutral zinc chromate.

This composition of matter may consist of from 95% to 99% of petrolatum with which has been incorporated, by grinding very finely in a paint mill, from 1% to 5% of basic or neutral zinc chromate.

Inasmuch as the composition may soften under the summer sun and is likely to run, there may be added to the petrolatum hardening materials having a higher melting point than petrolatum.

As a specific example, there may be added to the petrolatum 5% of 136° paraffin; or 15% of white bees-wax; or 25% of carnauba wax. Other waxes having higher melting points than petrolatum will answer the same purpose.

The principal virtue of the composition is that it prevents "after corrosion" usually noticed in gun and rifle barrels where corrosion is likely to occur after anti-corrosive grease is applied. The compound above described will entirely prevent further corrosion.

I claim:

1. A composition of matter comprising petrolatum with which is finely incorporated zinc chromate.

2. A composition according to claim 1 in which the proportion of petrolatum is from 95% to 99%, and the proportion of zinc chromate from 1% to 5%.

3. A composition of matter consisting of petrolatum and a wax of higher melting point than petrolatum, with which is finely incorporated zinc chromate.

4. A composition according to claim 3 in which the proportion of zinc chromate is from 1% to 5%.

5. A composition according to claim 3 in which the proportion of wax is from 5% to 25% of the petrolatum.

In testimony whereof, I affix my signature.

MAXIMILIAN TOCH.